United States Patent
Marien (10) Patent No.: US 10,063,535 B2
(45) Date of Patent: Aug. 28, 2018

(54) USER AUTHENTICATION BASED ON PERSONAL ACCESS HISTORY

(71) Applicant: ONESPAN NORTH AMERICA INC., Chicago, IL (US)

(72) Inventor: Dirk Marien, Broechem (BE)

(73) Assignee: ONESPAN NORTH AMERICA INC., Chicago, IL (US)

( * ) Notice: Subject to any disclaimer, the term of this patent is extended or adjusted under 35 U.S.C. 154(b) by 0 days.

(21) Appl. No.: 14/982,157

(22) Filed: Dec. 29, 2015

(65) Prior Publication Data

US 2016/0191498 A1    Jun. 30, 2016

Related U.S. Application Data

(60) Provisional application No. 62/097,675, filed on Dec. 30, 2014.

(51) Int. Cl.
| | |
|---|---|
| *H04L 29/00* | (2006.01) |
| *H04L 29/06* | (2006.01) |
| *H04L 9/32* | (2006.01) |
| *G06F 21/31* | (2013.01) |

(52) U.S. Cl.
CPC ........ *H04L 63/0815* (2013.01); *G06F 21/316* (2013.01); *H04L 9/3271* (2013.01); *H04L 63/08* (2013.01); *H04L 63/10* (2013.01); *G06F 2221/2103* (2013.01); *G06F 2221/2111* (2013.01)

(58) Field of Classification Search
CPC ...... G06F 2211/003; G06F 2221/2103; H04W 12/06
See application file for complete search history.

(56) References Cited

U.S. PATENT DOCUMENTS

| | | | | |
|---|---|---|---|---|
| 8,904,493 | B1 * | 12/2014 | Dibble | H04L 63/08 726/4 |
| 8,955,058 | B2 * | 2/2015 | Castro | H04L 67/02 726/17 |
| 8,997,240 | B1 * | 3/2015 | Kohen | G06F 21/31 713/182 |
| 2005/0216768 | A1 * | 9/2005 | Eppert | G06F 21/31 726/5 |
| 2011/0016534 | A1 | 1/2011 | Jakobsson et al. | |
| 2011/0191838 | A1 * | 8/2011 | Yanagihara | G06F 15/16 726/7 |
| 2012/0156664 | A1 * | 6/2012 | Hurwitz | G09B 23/28 434/262 |
| 2013/0318580 | A1 * | 11/2013 | Gudlavenkatasiva | G06F 21/31 726/7 |

(Continued)

FOREIGN PATENT DOCUMENTS

WO    WO 2014/055279    4/2014

OTHER PUBLICATIONS

Just, Mike. "Designing and evaluating challenge-question systems." IEEE Security & Privacy 2.5 (2004): 32-39. (Year: 2004).*

(Continued)

*Primary Examiner* — Madhuri R Herzog
(74) *Attorney, Agent, or Firm* — RatnerPrestia (57) ABSTRACT

Methods and systems are provided for authenticating a user using data related to the historical interactions of the user with computer based applications.

40 Claims, 3 Drawing Sheets

(56) References Cited

U.S. PATENT DOCUMENTS

| | | | | |
|---|---|---|---|---|
| 2014/0137219 A1* | 5/2014 | Castro | ............... | H04L 63/08 726/6 |
| 2014/0282963 A1* | 9/2014 | Wildermuth | ............ | H04L 63/08 726/7 |
| 2015/0150104 A1* | 5/2015 | Melzer | ................ | G06F 21/316 726/7 |
| 2016/0057157 A1* | 2/2016 | Hu | ...................... | H04L 63/08 726/6 |

OTHER PUBLICATIONS

International Search Report and Written Opinion for PCT/US2015/067808 dated Mar. 15, 2016.

Kim Cartwright: "Information Sources and Metrics", Knowledge Based Authentication Symposium, Feb. 9, 2004, pp. 2-17. XP055255533; retrieved from the Internet Mar. 23, 2016.

* cited by examiner

USER AUTHENTICATION BASED ON PERSONAL ACCESS HISTORY

CROSS REFERENCE TO RELATED APPLICATIONS

This application claims priority to U.S. Provisional application Ser. No. 62/097,675 entitled USER AUTHENTICATION BASED ON PERSONAL ACCESS HISTORY, filed on Dec. 30, 2014, the contents of which are incorporated fully herein by reference.

FIELD OF THE INVENTION

The invention relates to securing remote access to computers and applications and remote transactions over computer networks. More specifically, the invention relates to methods and systems for authenticating a user taking into account personal access history data of the user.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, i.e. how to authenticate users of a computer based application.

These days the average user accesses on a more or less regular basis a significant number of applications and websites that are in most cases not related to each other. Many of these sites require some kind of user authentication before granting the user access. This has resulted in the average user having to manage a multitude of authentication mechanisms and credentials, especially username-password combinations. This poses in practice a significant convenience problem for many users: the average user finds it hard enough to remember a single secure password, let alone a multitude of them for a whole range of applications. Many users therefore tend to use the same password for several applications and sites and/or choose easy to remember, but also easy to guess, passwords. This in turn causes a serious security issue. In an attempt to offer a higher convenience and/or security, Single Sign-On (SSO) solutions have been developed. While such SSO solutions can make things much more convenient for users, they tend to be a single point of failure from a security and accessibility point of view. Indeed, if the authentication mechanism that the user uses to authenticate with respect to the SSO system is compromised (e.g. because the user's password to the SSO system has been leaked) or is no longer accessible (e.g. because the user has blocked or forgotten the SSO password) then this may compromise or make inaccessible all the accounts that the SSO system may manage for the user.

What is therefore needed are systems and methods for authenticating a user that offer a higher security and/or convenience than existing systems.

DISCLOSURE OF THE INVENTION

The invention is based on an insight of the inventors that the many applications that a particular user accesses hold a treasure trove of information that is specific for that user.

The invention is further based on another insight of the inventors that while for many applications at least some of this information that is specific for that particular user may also be at least partially available to at least some other persons (for example other users of the same application that may have some relation to that particular user), it is unlikely that any other person will have access to all the information that is specific for that particular user. The corollary of that is that a person who is capable of demonstrating to have knowledge of all that information that is specific to the particular legitimate user is quite likely to be that particular legitimate user. More generally, the more information specific to the particular legitimate user that a person is capable of demonstrating to have knowledge about, the more likely it is for that person to effectively be that particular legitimate user.

The invention is further based on yet another insight of the inventors that it is for many users easier to remember details of their recent interactions with the applications they tend to regularly access than for example some password that may have no connection with the application.

The invention is further based on still another insight of the inventors that since a SSO system has the capability to log into a wide range of applications, the SSO system can in principle also have access to the same personal application information that the various applications may hold on a particular user and that may be accessible to that particular user when he or she is logged in.

General Principle.

In some embodiments a user of an SSO (Single Sign-On) system may be authenticated to the SSO system by correctly answering a series of questions related to knowledge about personal information related to the legitimate user. In some embodiments these questions may be related to the history of the interaction of the legitimate user with applications the access to which may be managed by the SSO system. In some embodiments these questions may be related to specific information that may be retrievable by the legitimate user from the applications that the user may access through the SSO system.

One aspect of the invention provides a method for authenticating a user. In some embodiments the method may comprise the steps of: providing authentication credentials on behalf of a user to a plurality of two or more computer based applications; obtaining data related to historical interactions of the user with the plurality of computer based applications; generating a series of questions for outputting at an access device, the questions relating to the historical interactions of the user with the plurality of computer based applications; receiving at the access device answers to the series of questions; evaluating the received answers; using the outcome of the evaluation of the answers to authenticate the user (or a person claiming to be the user). The data related to historical interactions of the user with the plurality of computer based applications may be referred to as personal historical application data or application interaction data elsewhere in this description.

In some embodiments the method may comprise the steps of: providing authentication credentials on behalf of a user to a plurality of two or more computer based applications; obtaining, from the plurality of computer based applications, application interaction data related to historical interactions of the user with the plurality of computer based applications; composing a series of questions relating to the historical interactions of the user with the plurality of computer based applications; receiving from the user (or a person claiming to be the user) answers to the series of questions; evaluating the received answers; using the outcome of the evaluation of the answers to authenticate the user (or a person claiming to be the user). In some embodiments the method may further comprise the step of submitting the series of questions to an access device accessible by the user (or a person claiming to be the user) for outputting the series of questions to the user (or a person claiming to be the user) at the access device.

In some embodiments the method may comprise the steps of: providing authentication credentials on behalf of a user to a plurality of two or more computer based applications; obtaining personal historical application data related to historical interactions of the user with the plurality of computer based applications; submitting a series of questions to a person claiming to be the user, the questions relating to the historical interactions of the user with the plurality of computer based applications; receiving from the person claiming to be the user answers to the series of questions; evaluating the received answers; using the outcome of the evaluation of the answers in deciding on whether or not to accept the person claiming to be the user.

In some embodiments the method may comprise any method of any of the previously described embodiments wherein the step of obtaining (personal historical application) data related to historical interactions of the user with the plurality of computer based applications may comprise obtaining some or all of this data from the plurality of computer based applications. In some embodiments the method may comprise any method of any of the previously described embodiments wherein the step of obtaining (personal historical application) data related to historical interactions of the user with the plurality of computer based applications may comprise obtaining some or all of this data from an access device that the user has used to interact with one or more of the computer based applications.

In some embodiments the method may comprise any method of any of the previously described embodiments wherein the step of evaluating the received answers may comprise determining the probability that the answers have been provided by a legitimate user. In some embodiments a number of factors may be used to determine this probability. One of these factors may be degree of correctness of the received answers. Another factor may be the likelihood that other persons than the legitimate user may have access to information that may be used to retrieve a correct answer to a particular question. This may be referred to as the degree of distribution of that information. For example some information may inherently be shared with or known to more people than other information. Yet another factor may be the likelihood that the correct answer to a specific question may be correctly guessed by a person other than the legitimate user even if that other person doesn't have access to the information revealing the correct answer. The more a correct answer is unexpected in view of average behaviour of a population of users or in view of the normal behaviour of a particular user, the higher the potential power of a question probing knowledge of this correct answer to distinguish a legitimate user from another person. This may be referred to as the entropy of a (correct) answer. For example, many people consult their email or use certain social media applications typically about every day. If the question is 'when did you last check your email', then the correct answer to this question is much less distinguishing if it is 'today' or 'yesterday' than if it is 'twelve days ago'.

In some embodiments the method may comprise any method of any of the previously described embodiments wherein the step of evaluating the received answers may comprise comparing the received answers to the obtained personal historical application data. In some embodiments the step of evaluating the received answers may comprise determining for each received answer the degree to which the received answer is consistent with the obtained personal historical application data. In some embodiments the step of evaluating the received answers may further comprise assigning a score to each received answer that reflects the degree to which the received answer is deemed to be consistent with the obtained personal historical application data.

In some embodiments the method may comprise any method of any of the previously described embodiments wherein the step of evaluating the received answers may further comprise combining all these scores assigned to the received answers into a single score. In some embodiments combining all these scores assigned to the received answers into a single score may comprise assigning different weights to each score when combining the scores whereby the weight for the score of an answer to a particular question may reflect the assumed degree of difficulty for a person other than the legitimate user to correctly answer that particular question. In some embodiments combining all these scores assigned to the received answers into a single score may for example calculating a (weighed) average of all the scores of the received answers.

In some embodiments the method may comprise any method of any of the previously described embodiments wherein the person claiming to be a particular user may be presented with a series of questions relating to the historical interactions of the user with the plurality of computer based applications. In some embodiments the series of questions may be fully determined before the series of questions is submitted or presented to the person claiming to be the user. In some embodiments the series of questions may be chosen and formulated before the series of questions is submitted to the person claiming to be the user. In some embodiments all or some of the series of questions may be submitted or presented to the person claiming to be the user at the same time. In some embodiments all or some of the series of questions may be submitted or presented one after the other to the person claiming to be the user. In some embodiments all (except a first question) or some of the series of questions may be submitted or presented to the person claiming to be the user only after the person claiming to be the user has provided an answer to a previously presented or submitted question of the series of questions. In some embodiments the series of questions is not (fully) determined in advance but may be dynamically composed, for example the choice and/or the formulation of one or more questions in such a series may be a function of the answers given to some of the previously presented or submitted questions of the series of questions.

In some embodiments the method may comprise any method of any of the previously described embodiments wherein the choice and/or the formulation of at least one or more questions may be a function of the obtained personal historical application data related to historical interactions of the user with the plurality of computer based applications. In some embodiments the choice and/or the formulation of at least one or more questions may be independent of the obtained personal historical application data related to historical interactions of the user with the plurality of computer based applications.

In some embodiments the method may comprise any method of any of the previously described embodiments wherein the personal historical application data may comprise data related to the time and/or date of the user accessing one or more of the computer based applications. In some embodiments the personal historical application data may comprise data related to the time and/or date of the user doing certain interactions with one or more of the computer based applications. In some embodiments the personal historical application data may comprise data related to the location from which one or more of the computer based applications have been accessed by the user for example at certain times or date. In some embodiments the system may be adapted to obtain knowledge about a user's location at certain moments, for example when logging in. In some embodiments the system may be adapted to obtain that information for example by using IP (Internet Protocol) geolocation techniques applied to the IP address of an access device of the user, or by accessing GPS (Global Positioning System) coordinates of an access device of the user. In some embodiments the personal historical application data may comprise data related to the order in which the user has accessed some of the computer based applications. In some embodiments the personal historical application data may comprise data related to the content of at least some transactions that the user has performed or submitted to one or more of the computer based applications. In some embodiments the personal historical application data may comprise application data associated with the user that one or more of the computer based applications holds or manages and that are accessible to the user.

In some embodiments the method may comprise any method of any of the previously described embodiments further comprising the step of comparing the received answers to the obtained personal historical application data related to historical interactions of the user with the plurality of computer based applications.

In some embodiments the method may comprise any method of any of the previously described embodiments wherein the step of using the outcome of the evaluation of the answers may also comprise using other information. In some embodiments the other information may comprise answers to a set of questions related to static personal user information that is not related to the history of the user's interactions with any of the computer based applications.

Another aspect of the invention provides a system for authenticating a user. In some embodiments the system may be adapted to perform at least some of the steps of any method of any of the previously described embodiments. In some embodiments the system may comprise a Single Sign-On (SSO) server that may be adapted to perform at least some or all of the steps of any method of any of the previously described embodiments.

Types and Examples of Personal Application Information.

Examples of information types and questions that may be used by an SSO system to authenticate a user may include the date, time, order and place of logging in to applications. Since users first sign on to the SSO system and since the SSO system has to authenticate on behalf of the user to the various applications that the user wishes to access, the SSO system may have precise information regarding which applications the user has accessed (or at least started to access) at which time and date and in what order. To authenticate the user the SSO system may ask questions about when and in what order the user accessed which applications. For example the SSO system may ask the user which applications the user has accessed the day before, or at what time the user started using application X, or which application the user started using after application Y.

In some embodiments the SSO system may also obtain information about the location of the user, for example when the user logs in to the SSO system and subsequently access certain applications. For example the SSO system may obtain the IP address of the access device, such as the user's PC (Personal Computer) or smartphone, that the user may have used to interact with the SSO system and the SSO system may use that IP address to estimate the user's location. The SSO system may use this information later on to ask the user about his or her whereabouts on the moment that the user logged into the SSO system or accessed certain applications.

Similarly, the SSO system may obtain information about the access device that the user was using, such as the type of browser. The SSO system may therefore also ask which browser the user was using to access certain applications.

In some embodiments the SSO may use the capability that it has to login to the user's applications on behalf of the user, to login autonomously and obtain application information related to the user, more in particular to obtain information related to the interaction of the user with the application. For example from an internet banking application that the user uses, the SSO system may obtain information about the balance of a user's bank account, or about transactions that the user has recently made, e.g. how much money was transferred and to which party, or in the case of card payments, which card was used on what time and in which shop for which amount. In the case of a webmail application, the SSO system may obtain information about when a certain mail was sent or received, to or from which parties and what the subject was of that mail. From a social website the SSO system may for example learn who the user has recently added as friend or has de-friended, or what the user has recently posted to his or her friends or more in general what seems to be going on in the circle of friends and relations of the user.

The SSO system may use all this information to query a person that claims to be the user to find out to what extent that person is knowledgeable about that dynamic personal application information of the user and may therefore indeed be assumed to be the legitimate user.

In some embodiments the SSO system may be adapted to generate or compose a series of questions to be submitted to the user. These questions may be related to the dynamic personal application information of the user and may be designed to probe the knowledge of the person claiming to be the user about that dynamic personal application information of the user, and the SSO system may be adapted to compare the application information related to the user that has been obtained by the SSO on the one hand to the answers provided by the person claiming to be the user to these questions on the other hand. The SSO may generate or compose the series of questions starting from a collection of question templates. Each question template may comprise both fixed and parameterized elements whereby a question may be generated or composed by providing determined values for all the parameterized elements of a chosen question template. Some of the values for some of the parameterized elements may be determined as a function of the application information related to the user that has been obtained by the SSO. Some of the values for some of the parameterized elements may be determined as a function of the answers provided by the person claiming to be the user to questions already submitted to the user. Some of the question templates may be generic in the sense that they are independent of any specific application of the user's applications or group of applications. Other question templates may be specific for a group or class of applications or even for a single particular application. In some embodiments applications may be classified in types of applications and certain question templates may be relevant for any application of a certain type. For example, some applications may be classified as being of the type 'email application' and a corresponding question template may be "what was the subject of the last email that you have sent with <email application X>?", where <email application X> is a parameter that has to be replaced with the name of one of the user's applications that belongs to the type 'email application'. This value, i.e. the name of an email application that the user is supposed to use, may have been determined on the basis of an answer to an earlier question such as "which email application have you been using most frequently in the last month?"

In some embodiments some aspects of the process to generate or compose a series of questions may involve random decisions. This may be to prevent an attacker from being able to predict which questions will be asked. For example to some extent the number of questions, the order of questions, the choice of question templates, and the choice of values to provide to certain parameters in some of the question templates may be randomized. In some embodiments such randomized decisions may be taken using a real or pseudo-random generator.

Selecting and Weighing Information.

Not all information obtained in this way may have the same significance. For example, if the user is in the habit of accessing a certain site on a daily basis at about the same time, the response to a question about when the user visited this site for the last time will be easily predictable for anyone who is familiar with the user's habits, especially if the application is used to communicate with friends or relations of the user. Also, a user will in general not have a perfect recollection about his or her own personal application history. It may therefore be expected that even the legitimate user may occasionally give a wrong or unsatisfactory answer to certain questions.

In some embodiments the SSO system may therefore be adapted to judiciously select the information about which to ask the user questions. For example, the SSO system may be adapted to preferably select information that is difficult to guess by other persons than the legitimate users. Also the SSO system may be adapted to assign different weights to different questions. For example questions related to information that is unlikely to be known by anyone else than the legitimate user may have a larger weight than questions related to information that may be well known among persons familiar with the legitimate user.

Freshness.

When selecting the information to use in the authentication questions, the SSO system may take into account the freshness of the information. In general a user is more likely to remember information about recent events than about events that occurred more distantly in the past. For example, many users may be capable of remembering which applications they accessed the day before, but would be hard-pressed to remember the same thing for a particular day 6 months ago. Similarly, a user is much more likely to remember the subject of the last email he or she sent via a particular email account the day before than the subject of an email sent several months ago. In some embodiments an SSO system may therefore preferably select information about recent events rather than information about older events.

Heterogeneity of Subject Matter.

In some embodiments the SSO system may be adapted to submit questions to the user that relate to a variety of applications. In some embodiments the questions may be selected to be as heterogeneous as possible, for example to minimize the risk that a person other than the legitimate user but familiar to the legitimate user may be able to guess the correct answers. For example a SSO system may combine questions regarding the content on a social media site accessed by the user with questions regarding emails sent and/or received by a web mail application used by the user.

In some embodiments the SSO system may be adapted to cross reference the content of different applications in order to verify to what extent this content may be overlapping and/or accessible to others. In some embodiments the SSO system may be adapted to analyse the contents of various applications and optimize the questions related to these various applications to ensure they have a maximum discriminatory power in distinguishing the legitimate user from other people who may be close to the user or familiar with the user and therefore may have access to at least some of the information content of at least some of the applications used by the user.

Sharing Applications and Non_Sharing Applications (Social Media Versus Web Banking).

For example the SSO system may be adapted to retrieve from a web mail application the list of persons to whom the user sent his or her last email and may be adapted to retrieve the contents of a private post on a social media site. The SSO system may be adapted to realise that at least some of the persons in the destination list of the email are also in the user's circle of friends of the social media site that have access to the contents of the private post and therefore the answers to questions based on emails exchanged with those individuals. To strengthen the discriminating power of the questions the SSO system may therefore ask a question about another email sent to a person that is not among the user's circle of social media site friends.

Evaluating the Answers.

Since an average user cannot be expected to have a perfect recollection of all details of his or her interaction with all the applications the user has interacted with in the past, in some embodiments an SSO system may be tolerant of a certain level of errors or inaccuracies in the responses given by a user.

In some embodiments the SSO system may query the user with a series of questions and my attribute a score to the response of each question. The SSO system may combine these individual question scores into an overall score, for example by adding the individual question scores. In some embodiments the SSO system may give positive scores to correctly answered questions and combine the positive scores to obtain a measure of the degree the user answered the questions correctly and is apparently knowledgeable about the user's dynamic personal application history. In some embodiments the SSO system may obtain some measure of the degree the user answered the questions overall correctly and may use that measure as an indication of the probability the person who claims to be a particular user is effectively the legitimate user. In some embodiments the SSO system may give positive scores to correctly answered questions and combine the positive scores to obtain a measure of the degree the user answered the questions correctly and is apparently knowledgeable about the user's dynamic personal application history. In some embodiments the SSO system may obtain some measure of the degree the user answered the questions incorrectly and may use that measure as an indication of the probability the person who claims to be a particular user is actually not the legitimate user. In some embodiments the SSO system may give negative scores to incorrectly answered questions and combine the negative scores to obtain a measure of the degree the user answered the questions overall incorrectly and is apparently not knowledgeable about the user's dynamic personal application history. In some cases an answer can in general be both correct to some degree and incorrect to another degree. In some embodiments the SSO system may give both a negative score (reflecting the degree the answer was incorrect) and a positive score (reflecting the degree the answer was correct) to the answer of a question and may combine the positive scores of all questions into an overall positive score and may combine the negative scores of all questions into an overall negative score.

Weighing the Answers.

In general questions may differ from one another with respect to the probability that a person that is not the legitimate user may guess a more or less correct answer. Similarly, questions may differ from one another with respect to the probability that the legitimate user may be mistaken and give an incorrect answer or may not recollect the correct answer. To take this into account in some embodiments the SSO system may be adapted to give differing weights to the separate questions when analysing the answers. For example in some embodiments the SSO system may give scores to the answers and may multiply the score of each answer with a weight that may be specific for each question before combining the thus weighted scores (e.g. by adding the weighted scores). In some embodiments the weighing may be asymmetrical for the positive scores (that are intended to reflect the degree that a question may have been correctly answered) with respect to the negative scores (that are intended to reflect the degree that a question may have been incorrectly answered). I.e. in some embodiments the weight for a correct answer to a particular question may be quite different than the weight for an incorrect answer to the same question. For example in some embodiments a specific question may be deemed relatively easy to guess by a person that is not the legitimate user and may therefore have a relatively low weight for a correct answer whereas it may be deemed very improbable for the same question that the legitimate user would not be able to answer the question correctly and therefore a high weight may be given to an incorrect answer to that question. For example in some embodiments a specific question may be deemed not very hard for at least some persons that are not the legitimate user to answer correctly so that a relatively low weight may be given to a correct answer, while it may at the same time be deemed quite likely that even the legitimate user may have trouble in recollecting the correct answer so that also a low weight may be given to an incorrect answer.

For example in some embodiments the system may be configured to ask a person claiming to be a particular user a question about a particular mail that user may have sent. For example the system may ask that person to how many recipients that mail has been sent. Statistically, certain numbers of recipients are more probable than other numbers of recipients. It may for example be much more probable for any mail to have a single recipient than for example 14 recipients. The system may be configured to give a higher weight questions for which the correct answer has a value that is statistically less probable and therefore less likely to be guessed correctly by another person than the legitimate user. The system could therefore in this case be configured such that the weight given to a correct answer to this question is higher if there are more recipients. In another example the system may also ask that person to which recipients that mail has been sent. In this case, apart from the legitimate user, also all actual recipients would be able to correctly answer this question. The system could therefore in this case be configured such that the weight given to a correct answer to this question is lower if there are more recipients.

Degree of Specificity and Correctness of Answers.

In some embodiments the SSO may submit questions to the user that don't have a single correct answer but for which many answers can be more or less correct differing among each other in their accurateness or specificity. For example in some embodiments an SSO may request the user to specify the time at which a certain event took place. If that event took place, for example, the day before at 5.03 pm then all the following answers are in principle correct: "sometime last month", "yesterday", "yesterday late afternoon", "yesterday early evening", "yesterday around 5 pm". However, it is clear that some of these answers are much more precise than other answers and therefore contribute a lot more to demonstrate that the person answering the questions has indeed real knowledge about the event that the question is targeting. Also, answers like "5.10 pm", while strictly speaking are not correct, may nevertheless approach the actual time value quite well and may actually be more precise or accurate than other answers that formally may be correct (like "yesterday") but are a lot less precise. Therefore in some embodiments the SSO system may be adapted to determine a degree of correctness and/or a degree of accurateness for a given answer. In some embodiments the determined degree of accurateness and/or the degree of correctness may be used to determine a score for the answer.

Combining the Scores.

In some embodiments the (weighted) negative or positive scores may be combined into an overall negative or positive score by summing the negative or positive scores. In some embodiments the (weighted) negative or positive scores may be combined into an overall negative or positive score by computing a (weighted) average of the negative or positive scores. In some embodiments the (weighted) scores may be combined into an overall score by applying non-linear fuzzy-logic to the scores.

Using Artificial Intelligence and Expert Systems.

In some embodiments the SSO system may submit questions regarding the content of the interaction of the user with a certain application. In some embodiments the SSO system may use artificial intelligence and/or expert systems and/or systems for interpreting human language to interpret the application content for formulating meaningful questions and/or to interpret the user's answers and to compare the answers to the information collected from the application in order to judge the degree of correctness of the answers. For example an SSO system may submit to a user the question what the user discussed the day before with friend Z using application A. The user may for example answer simply 'football'. The SSO system may use a human language interpretation system to analyse the dialog between the user and the user's friend X to find out that they were talking about the performance of player Q in the last match against club D. The SSO system may then use an expert system on human interests to realise that, although the word 'football' may not have been used in the entire dialog, the answer 'football' was nevertheless correct. On a more sophisticated level, the SSO system may use artificial intelligence algorithms to analyse historical dialogs of the user with friend X to realise that whenever the user and friend X are chatting they are always discussing a subject related to football so that the answer 'football', while being correct, has little discriminating power to distinguish the legitimate user from e.g. anyone who may be familiar with the legitimate user or even with friend X.

Circumstances and Variations of Use.

In some embodiments the SSO system may use the dynamic personal application data questions authentication mechanism in addition to a traditional authentication mechanism to authenticate the user, for example as a kind of double check or confirmation of the authentication achieved using the traditional authentication mechanism. For example in some embodiments the user may be asked to present the SSO system a username and password. In addition the user may also be asked to answer one or more questions related to the personal application history of the legitimate user.

Avoiding Privacy Leakage.

In some embodiments some questions themselves could already give away personal and potentially privacy sensitive information about the legitimate user to the person (claiming to be the user) who is asked to answer the questions. For example a question like "when did you last access application X" already by itself reveals that apparently the legitimate user is effectively using application X. A question like "what was the subject of the email that you have sent to person Y yesterday evening" reveals that apparently the legitimate user knows person Y, has sent an email to person Y and has sent that email to person Y yesterday.

To avoid such privacy leakage problems, the system may be adapted to formulate questions that don't leak personal information about the legitimate user i.e. to formulate only privacy neutral questions. For example the system may be adapted to not use personal data related to the legitimate user in formulating the questions but use that personal data only in evaluating the answers of the person claiming to be the legitimate user. Instead, the system may for example be adapted to formulate a series of multiple choice questions where the union of answers for any particular question cover all possible answers that are in principle consistent with the answers given to the previous answers. For example instead of asking the question "when did you last access application X", the system could ask a series of multiple choice questions; for example the first question could be "please indicate all of the following applications (if any) that you have accessed in the last month: app X, app Y, app Z, none of the above?"; if the user responded "app X and app Z" the next question could be "when did you last access app X: today, yesterday, last week, longer ago than last week, I don't remember?".

In other embodiments the user may have to pass first a first level of authentication before the user is confronted with questions that might in their formulation reveal to some extent personal information about the user. This first level of authentication may for example be based on the user providing a valid user_name-password combination, or the user providing correct answers to questions for static personal information of the type "what is your mother's maiden name?", or the user providing satisfactory answers to a series of privacy neutral questions as explained in more detail above.

In some embodiments the user may be asked at an enrolment or configuration phase to choose or specify himself or herself a list of questions that the user deems acceptable.

In some embodiments if the user answered a first question incorrectly, then the SSO system may ask additional questions. In some embodiments if the user didn't do well in responding to the questions regarding the personal application history then the SSO system may take appropriate action even if the user provided a correct password (or other credential of a traditional authentication mechanism). For example in some embodiments the SSO system may refuse access to the user if the user didn't do well in responding to the questions regarding the personal application history even if the authentication based on a traditional authentication message was successful. In some embodiments the user may be temporarily refused access and an alert may be sent out via some out-of-band communication mechanism like for example using an SMS (Short Message Service) text message or a telephone call.

In some embodiments the SSO system may use the dynamic personal application data questions authentication mechanism as an alternative or back-up to a traditional authentication mechanism to authenticate the user, for example in case that the traditional authentication mechanism has been compromised or is no longer useable or accessible to the user, for example if the static password has been compromised or has been blocked due to too many wrong attempts or forgotten by the user, or if a strong authentication token for generating one-time passwords or a PKI (Public Key Infrastructure) smart card belonging to the user got lost or stolen. In such cases the SSO system may use the dynamic personal application data questions authentication mechanism as a back-up authentication mechanism to authenticate the user and for example to issue the user new credentials for the traditional authentication mechanism (such as resetting a password and issuing the new value of the password to the user).

Combine with Static Personal Information.

In some embodiments querying the user regarding the user's knowledge of the dynamic personal application history of the user may be combined with questions into static personal information such as 'what is your father's date of birth', 'what is the name of your first pet', 'at which college did you graduate', 'what is your mother's maiden name', . . . . While such questions about the user's static personal information have the advantage that a user is rather unlikely to forget them, they have the disadvantage that since they are static information there is always a risk that the correct answers may sooner or later be available to many other people. The situation is opposite with the dynamic personal application history information that the SSO system may retrieve from the applications to which it is capable to authenticate on behalf of the user. A person's interaction with an application tends to evolve in time so that new information continuously becomes available for usage by the SSO for authentication purposes. In some embodiments an SSO system may therefore combine questions for static personal information with complementary questions regarding the user's dynamic application history.

Gradually Increasing Level of Difficulty of Questions.

In some embodiments an SSO system may use the dynamic personal application data questions authentication mechanism in circumstances that for the user are rather unusual or may even be perceived as stressful. For example in some embodiments the SSO system may use the dynamic personal application data questions authentication mechanism as a back-up for a traditional authentication mechanism that may have been compromised or may have become unusable or inaccessible to the user. In such circumstances the user could be stressed which in turn may result in the user having more difficulties in answering the questions correctly. In some embodiments the SSO system may take this effect into account and may adapt the questions in an attempt to put the user at ease in order to alleviate this effect. For example in some embodiments the SSO system may be adapted to estimate for each of a series of questions what the risk might be that a user may adversely be affected by stress in correctly answering the questions and may rank the questions in order of this probability and may submit the questions to the user in this order. For example in some embodiments the SSO system may be adapted to preferably submit to the user at the beginning of the session preferably questions that the user may likely find easy to answer correctly and/or for which the user's ability to answer them correctly is likely to be affected the least by stress, and to submit to the user in a later phase of the authentication session those questions of which the SSO system estimates that the user may likely find more difficult to answer correctly and/or for which the user's ability to answer them correctly is likely to be affected more by stress, and to hold for the end of the authentication session those questions of which the SSO system estimates that the user may likely find the most difficult to answer correctly and/or for which the user's ability to answer correctly is likely to be affected the most by stress.

BRIEF DESCRIPTION OF THE DRAWINGS

The foregoing and other features and advantages of the invention will be apparent from the following, more particular description of embodiments of the invention, as illustrated in the accompanying drawings.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention.

Figure 1:
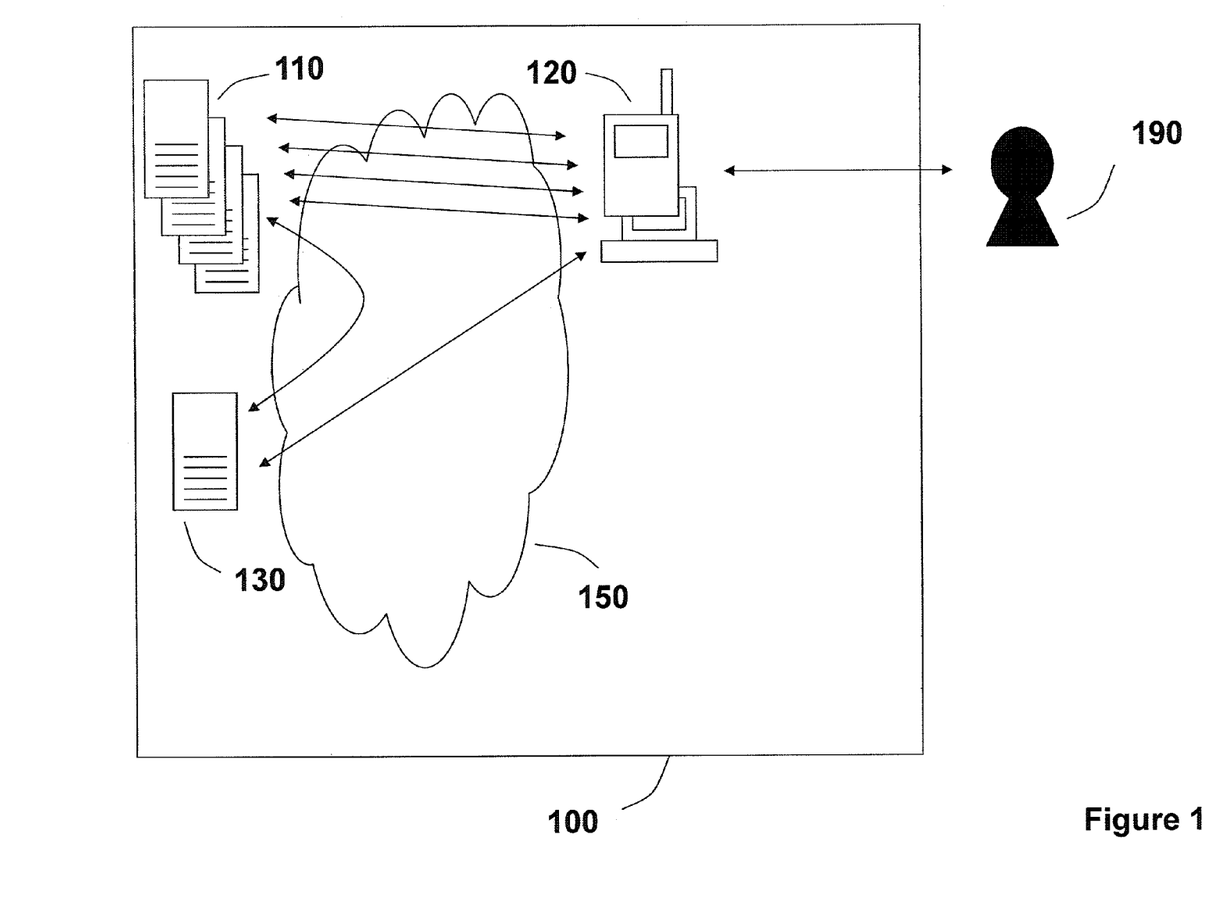
FIG. 1 schematically illustrates an exemplary system according to an aspect of the invention.

FIG. 1 schematically illustrates an exemplary system (100) of the invention according to an aspect of the invention.

In some embodiments the system may comprise a plurality of application servers (110) for hosting at least two different computer based applications and one or more access devices (120) for allowing a user (190) to access and/or interact with the various computer based applications. In some embodiments the system may furthermore comprise an SSO server (130) for authenticating the user and for providing the user access to the various computer based applications. In some embodiments the application servers and/or the access devices and/or the SSO server may communicate with each other, e.g. to exchange data, over a computer network (150) which may for example comprise the internet.

In some embodiments the access device(s) (120) may be adapted to allow the user (190) to access and/or to interact with the computer based applications. In some embodiments the access device may comprise a user input interface (such as a keyboard) and/or a user output interface. The access device may further comprise a network interface to connect the access device to a computer network (150) e.g. for communicating with the application servers (110) and/or the SSO server (130). In some embodiments the access device may comprise for example a Personal Computer (PC), a laptop, a tablet computer, or a smartphone. In some embodiments the access device may comprise an SSO client agent that may cooperate with the SSO server (130) in authenticating the user to the SSO server and/or in providing authentication credentials to one or more of the application servers (190) on behalf of the user. For example in some embodiments the SSO server may provide these authentication credentials to the agent on the access device and the agent may provide the authentication credentials in turn to the one or more application servers.

In some embodiments at least some of the computer based applications may comprise web based applications and the application servers (110) may comprise web servers.

In some embodiments the SSO server (130) may be adapted to provide on behalf of the user authentication credentials to at least some of the at least two computer based applications for authenticating the user. In some embodiments the SSO server may comprise a database for example to store username-password combinations associated with the user for at least some of the at least two computer based applications. The SSO server may comprise one or more computing devices such as one or more server computers. These one or more server computers may comprise a data processor component such as a microprocessor and a data storage component such as a RAM memory and/or a hard disk for storing data and computer code for carrying out one or more tasks and/or method steps described in more detail elsewhere in this description.

In some embodiments the system may be used with any of the embodiments of a method for authenticating a user as described elsewhere in this description. In some embodiments the SSO server (130) may be adapted to carry out one or more or all the steps of any of the methods for authenticating a user described elsewhere in this description. In some embodiments one or more of the steps of any of the methods for authenticating a user described elsewhere in this description may be performed by an access device (120). For example in some embodiments an access device (120) may comprise a software agent to perform, possibly in cooperation with an SSP server (130), one or more of the steps of any of the methods for authenticating a user described elsewhere in this description.

Figure 2:
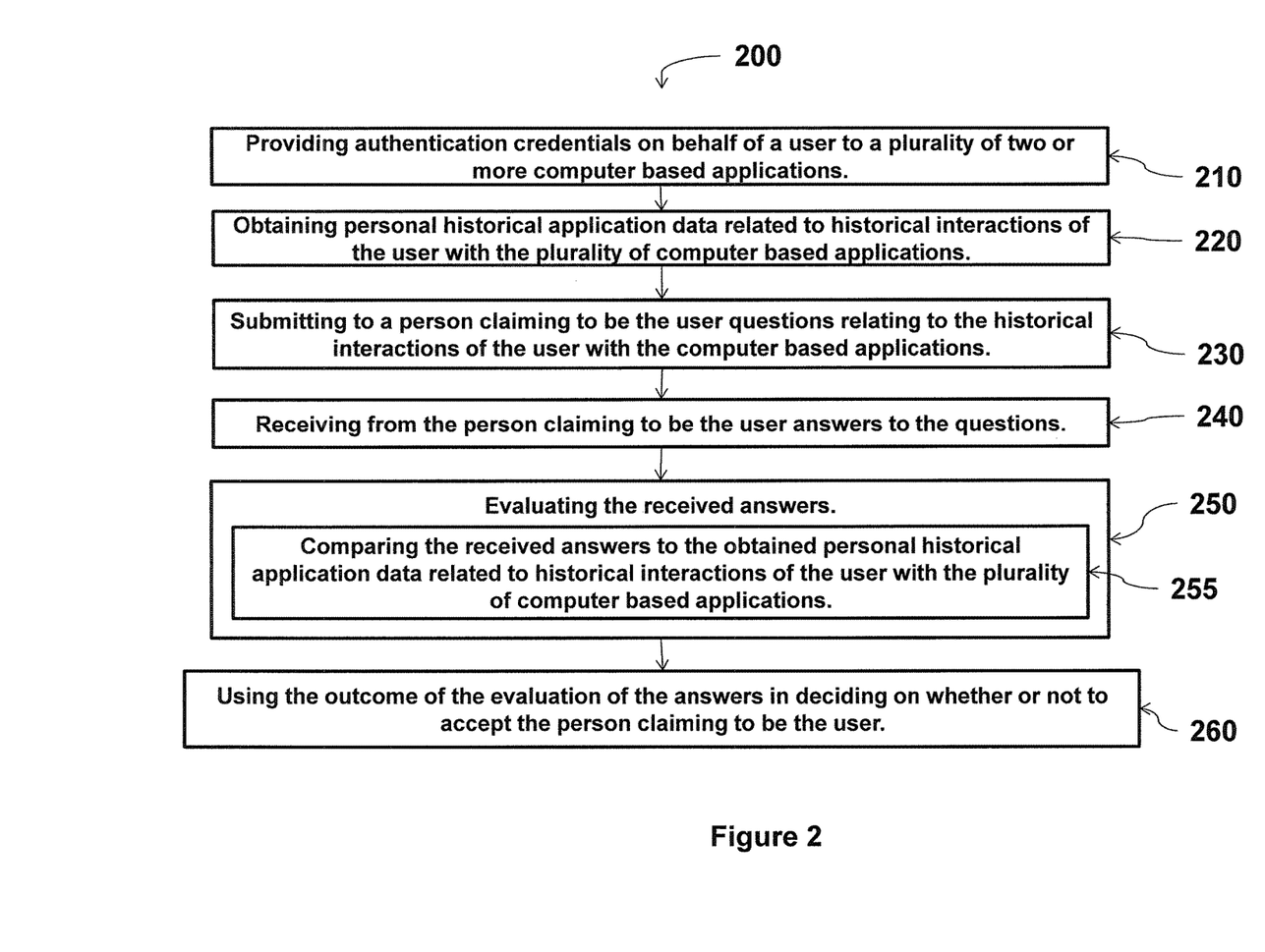
FIG. 2 schematically illustrates an exemplary method according to an aspect of the invention.

FIG. 2 schematically illustrates an exemplary method (200) for authenticating a user according to an aspect of the invention. Variants of the method may be used with systems such as any of the systems described elsewhere in this description.

In some embodiments the method may comprise the step of providing (210) authentication credentials on behalf of a user to a plurality of two or more computer based applications. For example in some embodiments this step may comprise providing username-password combinations that are associated with the user for at least some of the two or more applications.

In some embodiments the method may comprise the step of obtaining (220), e.g. from the plurality of computer based applications, personal historical application data (e.g., application interaction data) related to historical interactions of the user with the plurality of computer based applications. In some embodiments the personal historical application data may comprise data related to the time and/or date of the user accessing one or more of the computer based applications. In some embodiments the personal historical application data may comprise data related to the time and/or date of the user doing certain interactions with one or more of the computer based applications, such as for example reading a specific email received by a web mail application or reacting on a posting in a social media application or placing an order in stock trading application. In some embodiments the personal historical application data may comprise data related to the location from which one or more of the computer based applications have been accessed by the user. In some embodiments the personal historical application data may comprise data related to the order in which the user has accessed some of the computer based applications. In some embodiments the personal historical application data may comprise data related to the content of at least some transactions that the user may have performed or submitted to one or more of the computer based applications. In some embodiments the personal historical application data may comprise application data associated with the user that one or more of the computer based applications may hold and/or manage and that may be accessible to the user. In some embodiments this step of obtaining personal historical application data related to historical interactions of the user with the plurality of computer based applications, may comprise logging in to one or more of the computer based applications on behalf of the user and may also comprise interacting with these one or more of the computer based applications to retrieve from these one or more of the computer based applications the aforementioned personal historical application data.

In some embodiments the method may comprise the step of submitting (230) a series of questions to a person claiming to be the user, the questions relating to the historical interactions of the user with the plurality of computer based applications. In some embodiments the method may comprise the step of submitting (230) the series of questions to an access device accessible by the person claiming to be the user. In some embodiments the method may further comprise the step of the access device forwarding (230) the series of questions to the person claiming to be the user.

In some embodiments the method may comprise the step of receiving (240) from the person claiming to be the user answers to the series of questions.

In some embodiments the method may comprise the step of evaluating (250) the received answers. In some embodiments the step of evaluating the answers may comprise comparing (255) the received answers to the obtained personal historical application data related to historical interactions of the user with the plurality of computer based applications.

In some embodiments the method may comprise the step of using (260) the outcome of the evaluation of the answers in for example deciding on whether or not to authenticate the person claiming to be the user, e.g., to a computer system, network, and/or application. In some embodiments the step of using the outcome of the evaluation of the answers may also comprise other information such as for example the answers to a set of questions related to static personal user information that may not be related to the history of the user's interactions with any of the computer based applications.

In some embodiments the method may comprise the method of any of the previously described embodiments further comprising the step of generating or composing the series of questions.

In some embodiments the method may comprise the method of any of the previously described embodiments wherein the step of composing the series of questions may comprise dynamically composing at least one question of the series of questions.

In some embodiments the step of dynamically composing at least one question of the series of questions comprises choosing or formulating said at least one dynamically composed question as a function of the answers received from the person claiming to be the user to one or more questions already submitted to the person of said series of questions.

In some embodiments the step of composing the series of questions may comprise choosing or formulating one or more questions of the series of questions as a function of the obtained personal historical application data related to historical interactions of the user with the plurality of computer based applications.

In some embodiments the step of composing the series of questions may comprise choosing or formulating one or more questions of the series of questions without taking into account the obtained personal historical application data related to historical interactions of the user with the plurality of computer based applications.

In some embodiments the step of composing the series of questions may comprise choosing or formulating all questions of the series of questions without taking into account the obtained personal historical application data related to historical interactions of the user with the plurality of computer based applications.

In some embodiments the step of composing the series of questions may comprise storing a list of question templates, selecting at least one question template of the stored list of question templates and composing at least one question on the basis of the at least one selected question template. In some embodiments the at least one selected question template may comprise one or more parameterized elements and said composing said at least one question on the basis of said at least one selected question template may comprise determining a value for the one or more parameterized elements.

In some embodiments the step of composing the series of questions may comprise obtaining and using a random data element. In some embodiments the step of composing the series of questions may comprise using said random data element to determine the number of questions or the order of questions in the series of questions. In some embodiments the step of composing the series of questions may comprise using said random data element to choose at least one question template from a stored list of question templates and using the chosen at least one question as the basis to compose at least one of the questions in the series of questions. In some embodiments the step of composing the series of questions may comprise using said random data element to choose a value for a parameter in a question template that may be used as the basis to compose at least one of the questions in the series of questions.

In some embodiments the method may comprise the method of any of the previously described embodiments wherein the series of questions comprises questions relating to the historical interactions of the user with at least two different applications of the plurality of computer based applications.

In some embodiments the method may comprise the method of any of the previously described embodiments wherein the step of evaluating the received answers may comprise assigning a score to each received answer and combining the scores of the individual answers into an overall score.

In some embodiments the method may comprise the method of any of the previously described embodiments wherein the step of evaluating the received answers may comprise assigning a negative score to one or more of the received answers wherein such a negative score for a particular received answer reflects the degree of incorrectness of that particular received answer, and assigning a positive score to one or more of the received answers wherein such a positive score for a particular received answer reflects the degree of correctness of that particular received answer, and combining the negative scores of the individual answers into an overall negative score and combining the positive scores of the individual answers into an overall positive score.

In some embodiments the method may further comprise assigning different weights to the scores corresponding to different questions.

In some embodiments combining the negative of positive scores of the individual answers into an overall negative of positive score may comprise summing the negative of positive scores of the individual answers.

In some embodiments combining the negative of positive scores of the individual answers into an overall negative of positive score may comprise calculating an average of the negative of positive scores of the individual answers.

In some embodiments combining the scores of the individual answers into an overall score may comprise calculating the overall score as a non-linear function of the scores of the individual answers.

In some embodiments combining the scores of the individual answers into an overall score may comprise applying fuzzy logic to the scores of the individual answers.

In some embodiments the method may comprise the method of any of the previously described embodiments further comprising the step of applying a first authentication test to the person claiming to be the user prior to said step of submitting a series of questions to a person claiming to be the user wherein performing said step of submitting a series of questions to a person claiming to be the user is conditional on the person claiming to be the user successfully passing said first authentication test.

In some embodiments at least some of the steps of the method may be performed by an SSO system or server like an SSO server of the system described in relation to FIG. 1. In some embodiments all the steps of the method are automatically performed by a computer system, such as an SSO system or server like an SSO server of the system described in relation to FIG. 1, for example in order to protect the privacy of the user's personal data and/or to prevent access to persons other than the legitimate user to authentication credentials associated with the user and suitable to authenticate the user to one or more computer based applications.

Figure 3:
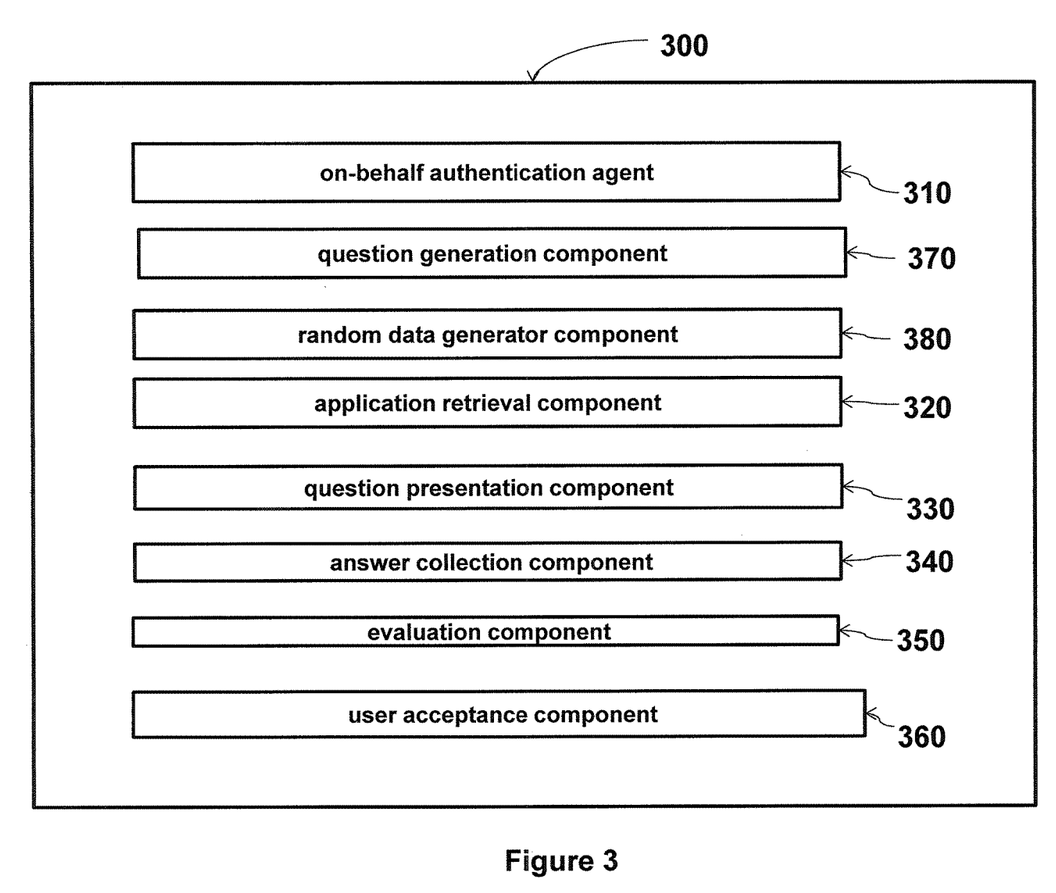
FIG. 3 schematically illustrates another exemplary system according to an aspect of the invention.

FIG. 3 schematically illustrates an exemplary system of the invention according to an aspect of the invention. In some embodiments both FIG. 1 and FIG. 3 may illustrate the system.

In some embodiments the system may comprise a Single Sign-On (SSO) system (300) for authenticating a user to a plurality of two or more computer based applications, wherein the SSO system may comprise: an on-behalf authentication agent (310) adapted to provide authentication credentials on behalf of a user to a the plurality of two or more computer based applications; an application retrieval component (320) adapted to obtain personal historical application data related to historical interactions of the user with the plurality of computer based applications; a question presentation component (330) adapted to submit a series of questions to a person claiming to be the user, the questions relating to the historical interactions of the user with the plurality of computer based applications; an answer collection component (340) adapted to receive from the person claiming to be the user answers to the series of questions; an evaluation component (350) adapted to evaluate the received answers; a user acceptance component (360) adapted to use the outcome of the evaluation of the answers in deciding on whether or not to accept the person claiming to be the user.

In some embodiments the SSO system may comprise an SSO server, such as an SSO server (130) discussed in connection to FIG. 1, and one or more of the above mentioned components and/or agents comprised in the SSO system may be comprised in this SSO server. In some embodiments the SSO system may also comprise an access device, such as an access device (120) discussed in connection to FIG. 1, and one or more of the above mentioned components and/or agents comprised in the SSO system may be comprised in this access device.

In some embodiments the SSO system may further comprise a question generation component (370) adapted to generate said series of questions. In some embodiments the SSO system may further comprise a data storage component adapted to store a list of question templates and said generation component may be further adapted to generate at least one question of said series of questions on the basis of at least one question template of said list of question templates.

In some embodiments the SSO system may further comprise a random data generator component (380) adapted to generate a random data element and said generation component may be further adapted to use the value of said random data element in said generation of said series of questions.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature may have been disclosed with respect to only one of several implementations, such feature may be combined with one or more other features of the other implementations as may be desired and advantageous for any given or particular application. With respect to embodiments of the methods, while the various steps have been described in a particular order, it will be apparent for a person skilled in the art that the order of at least some of these steps may be altered. It will also be apparent for a person skilled in the art that some steps may be optional and other steps may be added. While various embodiments have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations are possible. Thus, the breadth and scope of the teachings herein should not be limited by any of the above described exemplary embodiments but should be defined only in accordance with the following claims and their equivalents.

The invention claimed is:

1. A method for authenticating a user comprising the steps of:
providing authentication credentials on behalf of a user to a plurality of two or more server-hosted computer based applications;
obtaining, from the plurality of server-hosted computer based applications, application interaction data comprising non-public personal data from historical interactions of the user with the plurality of server-hosted computer based applications that is accessible from the plurality of server-hosted computer based applications using the provided authentication credentials;

composing a series of questions relating to the historical interactions of the user with the plurality of server-hosted computer based applications, wherein the composing the series of questions uses the non-public personal data;

submitting the series of questions for review b the user;

receiving, from the user, answers to the series of questions;

evaluating the received answers;

using the outcome of the evaluation of the answers to authenticate the user.

2. The method of claim 1 further comprising the step of submitting the series of questions to an access device accessible by the user for outputting the series of questions to the user at the access device.

3. The method of claim 1 in which the application interaction data comprises data related to at least one of a time or a date of the user accessing one or more of the server-hosted computer based applications.

4. The method of claim 1 in which the application interaction data comprises data related to at least one of a time or a date of the user doing certain interactions with one or more of the server-hosted computer based applications.

5. The method of claim 1 in which the application interaction data comprises location related data related to a location from which one or more of the server-hosted computer based applications have been accessed by the user.

6. The method of claim 5 wherein said location related data comprises data obtained from a second access device from which the one or more of the server-hosted computer based applications have been accessed by the user.

7. The method of claim 6 wherein said data obtained from the second access device comprises Global Positioning System coordinates of the second access device at a moment the user was accessing the one or more server-hosted computer based applications.

8. The method of claim 6 wherein said data obtained from the second access device comprises an IP address of the second access device at a moment the user was accessing the one or more server-hosted computer based applications, and wherein the method further comprises applying geolocation techniques using said IP address to determine a geographical location.

9. The method of claim 1 in which the application interaction data comprises data related to an order in which the user has accessed some of the server-hosted computer based applications.

10. The method of claim 1 in which the application interaction data comprises data related to content of at least some transactions that the user has performed or submitted to one or more of the server-hosted computer based applications.

11. The method of claim 1 in which the application interaction data comprises application data that are associated with the user and that are held or managed by one or more of the server-hosted computer based applications and that are accessible to the user.

12. The method of claim 1 wherein the step of evaluation comprises the step of comparing the received answers to the obtained application interaction data related to historical interactions of the user with the plurality of server-hosted computer based applications.

13. The method of claim 1 wherein the step of using the outcome of the evaluation of the answers also comprises using other information.

14. The method of claim 13 wherein the other information comprises answers to a set of questions related to static personal user information that is not related to the history of the user's interactions with any of the server-hosted computer based applications.

15. The method of claim 1 wherein the step of composing the series of questions comprises dynamically composing at least one question of the series of questions.

16. The method of claim 15 wherein the step of dynamically composing at least one question of the series of questions comprises choosing or formulating said at least one dynamically composed question as a function of the answers received from the user to one or more questions of the series of questions that have already been submitted to the user.

17. The method of claim 1 wherein the step of composing the series of questions comprises choosing or formulating one or more questions of the series of questions as a function of the obtained application interaction data related to historical interactions of the user with the plurality of server-hosted computer based applications.

18. The method of claim 1 wherein the step of composing the series of questions comprises choosing or formulating one or more questions of the series of questions without taking into account the obtained application interaction data related to historical interactions of the user with the plurality of server-hosted computer based applications.

19. The method of claim 18 wherein the step of composing the series of questions comprises choosing or formulating all questions of the series of questions without taking into account the obtained application interaction data related to historical interactions of the user with the plurality of server-hosted computer based applications.

20. The method of claim 1 wherein the step of composing the series of questions comprises storing a list of question templates, selecting at least one question template of the stored list of question templates and composing at least one question on the basis of the at least one selected question template.

21. The method of claim 20 wherein the at least one selected question template comprises one or more parameterized elements and wherein said composing said at least one question on the basis of said at least one selected question template comprises determining a value for the one or more parameterized elements.

22. The method of claim 1 wherein the step of composing the series of questions comprises obtaining and using a random data element.

23. The method of claim 22 wherein the step of composing the series of questions comprises using said random data element to determine at least one of the number of questions or the order of questions in the series of questions.

24. The method of claim 22 wherein the step of composing the series of questions comprises using said random data element to choose at least one question template from a stored list of question templates and using the chosen at least one question template as a basis to compose at least one of the questions in the series of questions.

25. The method of claim 22 wherein the step of composing the series of questions comprises using said random data element to choose a value for a parameter in a question template that is used as a basis to compose at least one of the questions in the series of questions.

26. The method of claim 1 wherein the series of questions comprises questions relating to the historical interactions of the user with at least two different applications of the plurality of server-hosted computer based applications.

27. The method of claim 1 wherein the step of evaluating the received answers comprises assigning a score to each received answer and combining the scores of individual answers into an overall score.

28. The method of claim 1 wherein the step of evaluating the received answers comprises assigning a negative score to one or more of the received answers wherein such a negative score for a particular received answer reflects a degree of incorrectness of that particular received answer, and assigning a positive score to one or more of the received answers wherein such a positive score for a particular received answer reflects a degree of correctness of that particular received answer, and combining the negative scores of individual answers into an overall negative score and combining the positive scores of the individual answers into an overall positive score.

29. The method of claim 27 further assigning different weights to the scores corresponding to different questions.

30. The method of claim 27 wherein combining the scores of the individual answers into an overall score comprises summing the scores of the individual answers.

31. The method of claim 27 wherein combining the scores of the individual answers into an overall score comprises calculating an average of the scores of the individual answers.

32. The method of claim 27 wherein combining the scores of the individual answers into an overall score comprises calculating the overall score as a non-linear function of the scores of the individual answers.

33. The method of claim 27 wherein combining the scores of the individual answers into an overall score comprises applying fuzzy logic to the scores of the individual answers.

34. The method of claim 1 further comprising the step of applying a first authentication test to the user prior to said step of submitting a series of questions to the user wherein performing said step of submitting a series of questions to the user is conditional on the user successfully passing said first authentication test.

35. A system for authenticating a user comprising a Single Sign-On (SSO) server comprising a microprocessor and memory, the system adapted to perform the method of claim 1.

36. The system of claim 35 further comprising a software client agent running on an access device that is used by said user to access at least one of said plurality of server-hosted computer based applications and wherein said Single Sign-On server and said software client agent are adapted to cooperate to perform at least one step of the method.

37. A Single Sign-On (SSO) system for authenticating a user to a plurality of two or more server-hosted computer based applications, the system comprising:
 an on-behalf authentication agent adapted to provide authentication credentials on behalf of a user to the plurality of two or more server-hosted computer based applications;
 an application retrieval component adapted to obtain application interaction data comprising non-public personal data from historical interactions of the user with the plurality of server-hosted computer based applications that is accessible from the plurality of server-hosted computer based applications using the provided authentication credentials;
 a question presentation component adapted to submit a series of questions to the user, the questions relating to the non-public personal data from the historical interactions of the user with the plurality of server-hosted computer based applications;
 an answer collection component adapted to receive answers to the series of questions;
 an evaluation component adapted to evaluate the received answers;
 a user acceptance component adapted to use the outcome of the evaluation of the answers to authenticate the user.

38. The system of claim 37 further comprising a question generation component adapted to generate said series of questions.

39. The system of claim 38 further comprising a data storage component adapted to store a list of question templates and wherein said generation component is further adapted to generate at least one question of said series of questions on a basis of at least one question template of said first of question templates.

40. The system of claim 38 further comprising a random data generator component adapted to generate a random data element and wherein said generation component is further adapted to use a value of said random data element in said generation of said series of questions.

* * * * *